TAGGART & GROVER.
Corn Husker.
No. 16,201.
2 Sheets—Sheet 1.
Patented Dec. 9, 1856.
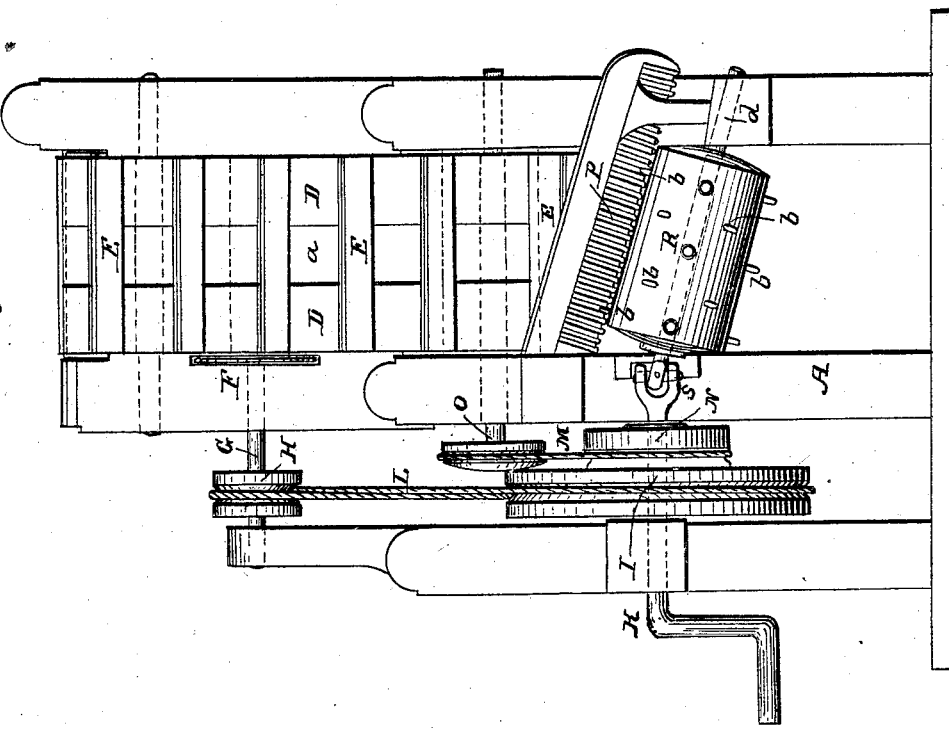
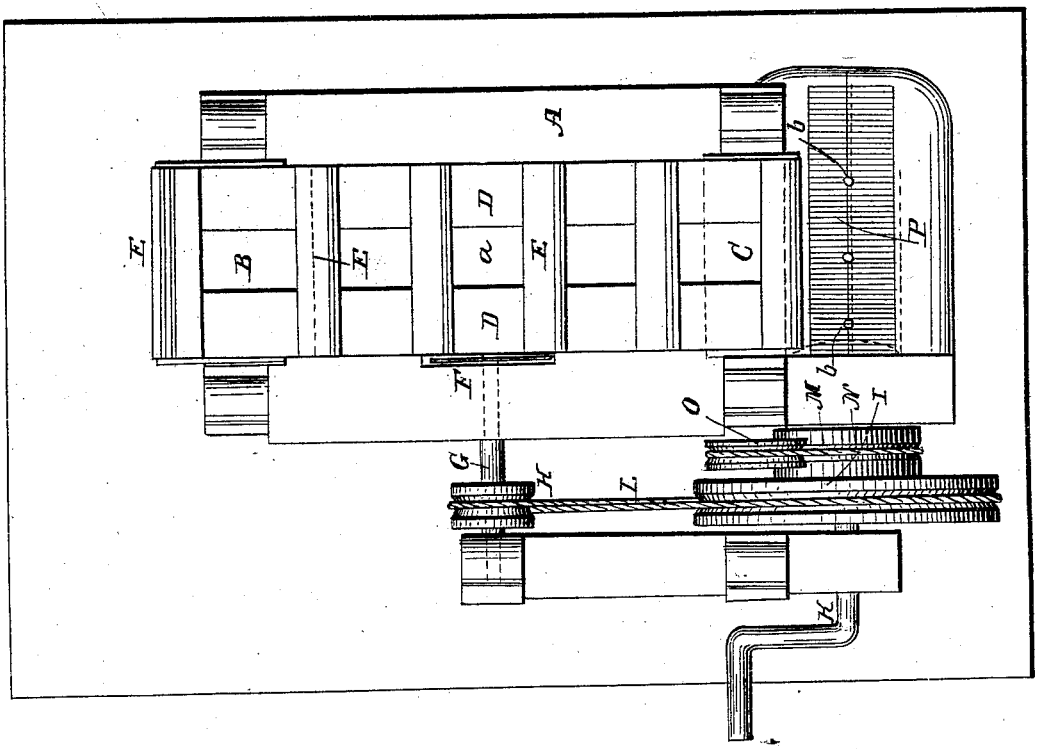

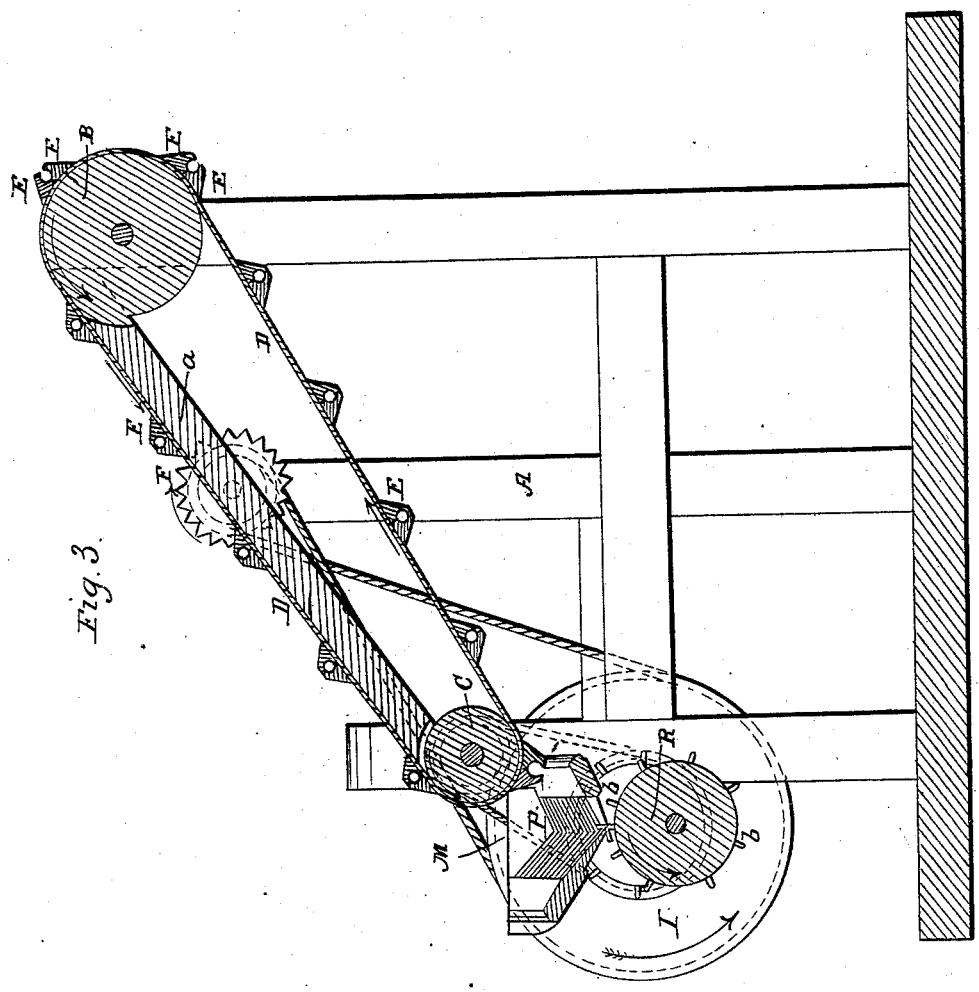

UNITED STATES PATENT OFFICE.

JOHN TAGGART AND LEONARD A. GROVER, OF ROXBURY, MASSACHUSETTS, ASSIGNORS TO TAGGART, GROVER, AND BARKER.

MACHINE FOR HUSKING CORN.

Specification of Letters Patent No. 16,201, dated December 9, 1856.

*To all whom it may concern:*

Be it known that we, JOHN TAGGART and LEONARD A. GROVER, of Roxbury, in the county of Norfolk and State of Massachusetts, have invented a new and useful or Improved Machine for Husking Maize or Indian Corn; and we do hereby declare that the same is fully described and represented in the following specification and the accompanying drawings, of which—

Figure 1 is a top view of our said machine; Fig. 2, a front elevation of it; Fig. 3, a vertical and longitudinal section taken through the endless carrier to be hereinafter described.

In the drawings, A, exhibits the frame of the machine, the same being made to support two cylindric drums B, C, arranged with respect to an inclined top board, a, as shown in Fig. 3. Around the peripheries of these two drums one or more endless aprons or belts, D, D, extend and work, such being provided with several sets of lags or jaws, E, E, arranged thereon, as shown in the drawings, there being two jaws to each of said sets. The endless apron or aprons and the jaws thereof we term the endless carrier. Arranged by the side of said endless carrier is a rotary cutter or saw, F, which is affixed on and to a horizontal shaft, G, carrying a pulley, H, around which and a wheel, I, fixed upon a driving shaft, K, and endless crossed belt, L, travels, and causes rotary motion to be imparted to the cutter or saw whenever the driving shaft is put in revolution. Besides the pulley, I, another pulley, N, is fixed upon the shaft, K, an endless belt, M, being made to extend and work around the pulley, N, and another pulley, O, fixed upon the shaft of the lower drum C, the same serving to impart rotary motion to said drum when the driving shaft is in revolution, such rotary motion causing the carrier belt to move down the inclined surface of the top board, a, of the frame A.

Arranged below the drum, C, as shown in Fig. 2, is a grated spout or inclined grate, P, the same being constructed so as to allow teeth, b, b, projecting from a barrel or drum, R, to pass transversely into between the grate bars and through the spout when said drum is put in revolution. This drum R, is arranged underneath the discharging grate, P, and parallel to it and has its shaft, d, connected with the driving shaft by a universal joint, S, so that when the driving shaft is put in revolution in the direction denoted by the arrow, e, on the larger pulley of said shaft the drum R, the endless carrier belt D, D, and the rotary saw or cutter F, will be put in motion simultaneously in directions denoted by arrows marked on them respectively as shown in Fig. 3.

In operating with the above described machine an ear of corn with the husk thereon is to be placed between each set of jaws, E, E, when they are passing over the upper part of the drum, B, the butt or stalk end of the ear being arranged so as to project beyond the carrier far enough for the rotary saw or cutter to remove it from the cob and leaves of the husk when it is carried into contact with and against said cutter. In passing by the drum, B, the jaws will close together and upon the ear of corn so as to firmly grasp the same. During the downward movement of the carrier the stalk will be separated from the ear, and the latter with the husk on it will be dropped or discharged into the inclined grate or spout P. The teeth of the drum, R, passing through the grate will sieze upon the husk and draw it between the grate bars and thereby separate it from the ear, which in consequence of the inclination of the spout in a longitudinal direction and the motion given it by the toothed barrel will be discharged from said spout. While each set of jaws is passing about the drum, C, the jaws thereof will be opened or moved apart so as to drop the ear of maize from between them.

We claim—

The combination of the endless receiving and discharging carrier (constructed substantially as described) the rotary cutter or saw, F, the inclined grated spout, P, and the toothed drum R, as arranged and made to operate together substantially in manner and for the purpose as specified.

In testimony whereof, we have hereunto set our signatures this 25th of October, A. D. 1856.

JOHN TAGGART.
L. A. GROVER.

Witnesses:
FRAS. A. BROOKS,
F. P. HALE, Jr.